United States Patent [19]
Nielsen

[11] Patent Number: 5,899,975
[45] Date of Patent: May 4, 1999

[54] STYLE SHEETS FOR SPEECH-BASED PRESENTATION OF WEB PAGES

[75] Inventor: Jakob Nielsen, Atherton, Calif.

[73] Assignee: Sun Microsystems, Inc., Palo Alto, Calif.

[21] Appl. No.: 08/826,588

[22] Filed: Apr. 3, 1997

[51] Int. Cl.[6] ............................... G10L 5/02; G10L 9/00
[52] U.S. Cl. ........................................... 704/260; 704/278
[58] Field of Search .................................... 704/260, 275, 704/278

[56] References Cited

U.S. PATENT DOCUMENTS

| | | | |
|---|---|---|---|
| 4,783,810 | 11/1988 | Kroon | 704/260 |
| 5,557,722 | 9/1996 | DeRose et al. | 395/148 |
| 5,708,806 | 1/1998 | DeRose et al. | 395/615 |
| 5,715,370 | 2/1998 | Luther et al. | 704/260 |

*Primary Examiner*—David R. Hudspeth
*Assistant Examiner*—Susan Wieland
*Attorney, Agent, or Firm*—McDermott, Will & Emery

[57] ABSTRACT

The presentation of audio information, particularly audio information generated by a voice synthesizer from text using a text or screen reader, is controlled using a style sheet. The style sheet permits default presentation styles, such as voice-family, voice-pitch, voice-variant, voice speed and volume to be set, and then varied based on embedded text presentation commands such as those found in hypertext markup language and in desktop publishing.

21 Claims, 10 Drawing Sheets

```
BODY {
   margin: 1em;
   font-family:  serif;
   line-height:  1.1;
   background:   white;
   color:   black;
}

H1, H2, H3, H4, H5, H6, P, UL, OL, DIR, MENU, DIV,
DT, DD, ADDRESS, BLOCKQUOTE, PRE, BR, HR {display: block}

B, STRONG, I, EM, CITE, VAR, TT, CODE, KBD, SAMP,
IMG, SPAN {display: inline}

LI {display:   list-item}

H1, H2, H3, H4 {margin-top: 1em; margin-bottom: 1em}
H5, H6 {margin-top: 1em}
H1 {text-align: center}
H1, H2, H4, H6 {font-weight: bold}
H3, H5 {font-style: italic}

H1 {font-size: xx-large}
H2 {font-size: x-large}
H3 {font-size: large}

B, STRONG {font-weight: bolder}   /* relative to the parent */
I, CITE, EM, VAR, ADDRESS, BLOCKQUOTE {font-style: italic}
PRE, TT, CODE, KBD, SAMP {font-family: monospace}
```

| DOCUMENT IDENTIFIER | STYLE SHEET ADDRESS(ES) | TYPE OF ADDRESS |
|---|---|---|
|  |  |  |

Figure 4

```
BODY {
   margin: 1em;
   font-family:  serif;
   line-height:  1.1;
   background:   white;
   color:  black;
   voice-family:  Susan, woman;
   voice-pitch:  mezzo-soprano
}

H1, H2, H3, H4, H5, H6, P, UL, OL, DIR, MENU, DIV,
DT, DD, ADDRESS, BLOCKQUOTE, PRE, BR, HR {display: block}

B, STRONG, I, EM, CITE, VAR, TT, CODE, KBD, SAMP,
IMG, SPAN {display: inline}

LI {display:  list-item}

H1, H2, H3, H4 {margin-top: 1em; margin-bottom: 1em}
H5, H6 {margin-top: 1em}
H1 {text-align: center}
H1, H2, H4, H6 {font-weight: bold}
H3, H5 {font-style: italic}

H1 {font-size: xx-large;
    voice-family: man;
    voice-volume: +20%;
    voice-pitch: bass;
    voice-speed: -15%}
H2 {font-size: x-large;
    voice-family: man;
    voice-pitch: baritone}
H3 {font-size: large;
    voice-pitch: contralto}

B, STRONG {font-weight: bolder}   /* relative to the parent */
I, CITE, EM, VAR, ADDRESS, BLOCKQUOTE {font-style: italic}
PRE, TT, CODE, KBD, SAMP {font-family: monospace}

```
BODY  {
   font-family:  Times-Roman;
   background:  blue;
   color:  white;
   voice-family:  Susan, woman;
   voice-pitch:  soprano;
   voice-speed:  200;
}

H1, H2, H3, H4, H5, H6, {display: block; voice-speed: -10%}
```

@import use (http:\\
www.cxx2.com\PUB\stylesheet1)

HTML DOCUMENT

STYLE SHEETS FOR SPEECH-BASED PRESENTATION OF WEB PAGES

FIELD OF THE INVENTION

This invention relates to computer based presentation of information and more particularly, to the use of stylesheets for controlling the presentation of audio derived from text by automatic devices such as text or screen readers.

BACKGROUND OF THE INVENTION

Stylesheets are known in the art for controlling the presentation of textual information. These can be found, for example, in word processors and desk top publishers.

A proposed recommendation for implementing stylesheets of this nature for use in the World Wide Web is found in a W3C recommendation dated Dec. 17, 1996. This recommendation is titled "Cascading Style Sheets, Level 1" can be found at http: //www.w3.org/pub/WWW/TR/REC-CSS1 and was authored by Hakon Wium Lie and Bert Bos. A copy of this recommendation is attached hereto as Appendix 1 and hereby incorporated by reference in its entirety.

Text and screen readers are also known in the art which have been used to provide auditory presentations of textual information through speech synthesis.

THE PROBLEMS

Existing stylesheets are limited to visual presentation of textual information and thus do not help users who cannot see the page.

When accessing textual information over a network, such as the worldwide web, it is desirable to enrich the user experience for users who might access the content of the web through a voice-only browser. Such users might include the visually impaired as well as users who access the web over a telephone; for example, by using a car telephone and data port while driving. It is desirable not to remove one's eyes from traffic to view information presented on a screen in such circumstances.

When using screen readers to provide auditory presentation of web pages to a user through speech synthesis, an auditory presentation can often be quite inappropriate. For example, consider a screen reader that is set to use a deep male voice but is used to access a woman's personal home page. The reading of text might begin "home page for Lisa Smith, I am a prima ballerina with the New York City Ballet . . . ." A user would be able to hear the text but would be quite distracted by the mismatch between the semantic content (a female ballerina) and the presentation (the deep male voice).

SUMMARY OF THE INVENTION

The present invention extends the concept of style sheets as illustrated in the cascading stylesheets recommendation referred to above to permit setting of the verbal and audio styles with which information is presented to a user.

The invention is particularly directed to the audio and verbal presentation of textual information containing imbedded formatting commands such as those found in desk top publishing or in html documents commonly used on the worldwide web.

The invention relates to apparatus for presenting textual information in audible form, including a computer equipped with an voice synthesizer, an application running on the computer and causing the voice synthesizer to present textual information to a user in audible form, and a style sheet for controlling presentation properties of information presented by the voice synthesizer.

The invention also related to methods of controlling the presentation of information generated by a voice synthesizer, by controlling the voice synthesizer using one or more style sheets containing presentation properties for the audible presentation of information or by retrieving one or more style sheets containing presentation properties for the audible presentation of information through a network or by presenting audible information in accordance with the one or more style sheets based on embedded text formatting commands.

The invention also relates to a system for presenting textual information in audible form, including a network, at least one server connected to the network and containing a document containing text, at least one server connected to the network containing at least one stylesheet specifying formatting for audible presentation of textual information, and a computer connected to the network for downloading a stylesheet from a server and controlling the presentation of textual information in audible form based on the style sheet.

The invention also relates to computer program products for carrying out these techniques.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The present invention will be disclosed in the context of an extension of cascading stylesheets to enable the coding of voice presentation properties. However, the invention is applicable to controlling the style or presentation properties of audible programs generally.

Figure 1A:
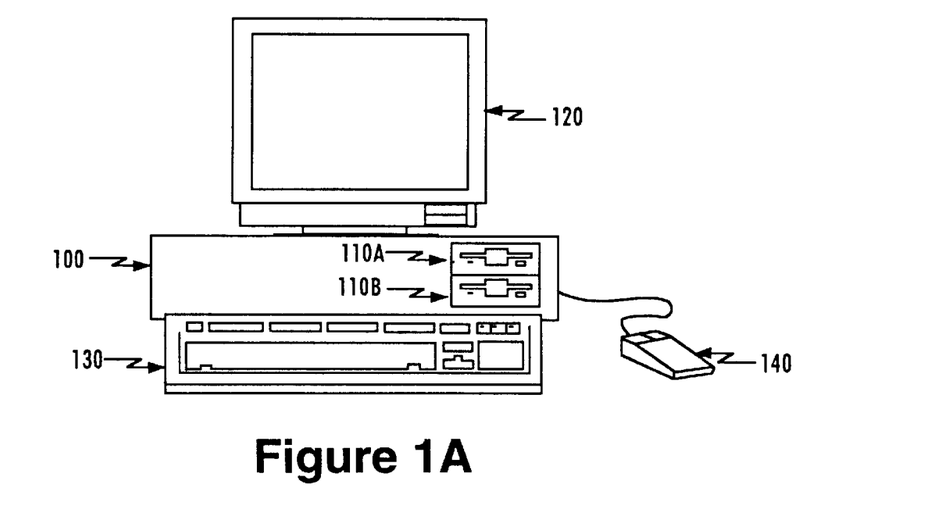
FIG. 1A is an illustration of an exemplary computer of the type suitable for use in carrying out the invention.

FIG. 1A is an illustration of an exemplary computer of a type suitable for use in carrying out the invention. FIG. 1A illustrates a computer system having a processor unit 100, a display unit 120, a keyboard 130, and an input/output device, such as a mouse 140. One or more disk drives 110A and 110B may be provided in the processor unit 100 to facilitate the storage and retrieval of information. One of these may be a hard drive (not shown) or drives utilizing removable media such as floppy drives or CD ROM drives.

Figure 1B:
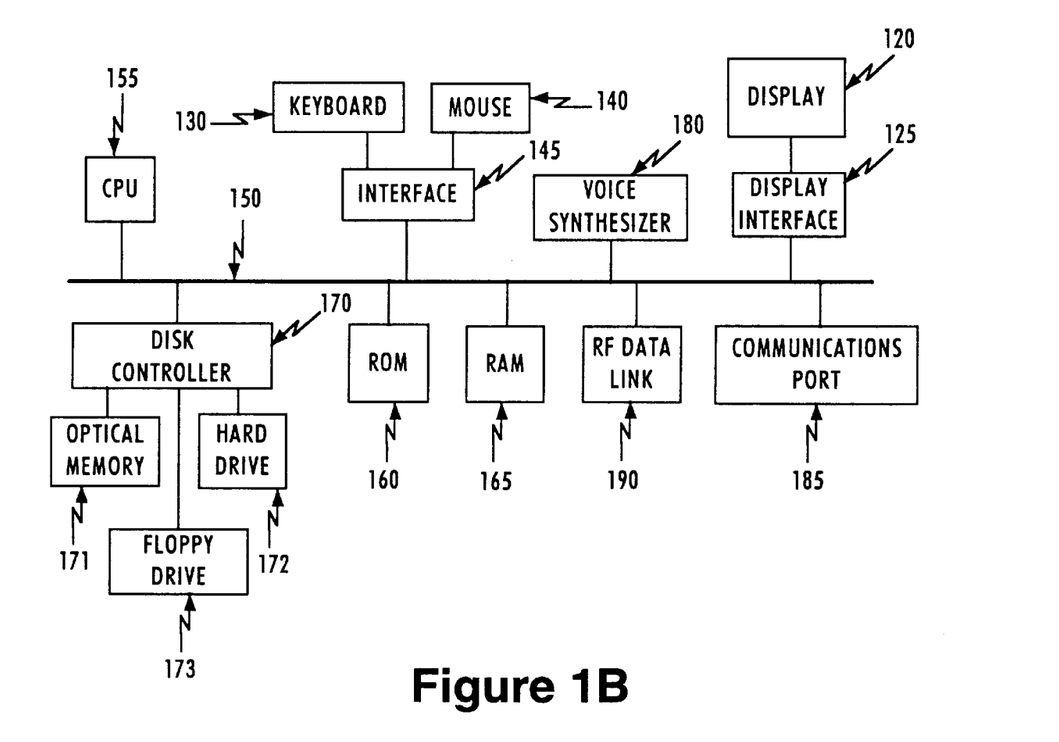
FIG. 1B is a block diagram of an exemplary computer bus architecture of a type suitable for carrying out the invention.

FIG. 1B is a block diagram of an exemplary computer bus architecture of a type suitable for carrying out the invention. A bus 150 connects a central processing unit 155 to other elements of a computer processor system 100. An interface 145 connects external input/output devices such as keyboard 130 and mouse 140 to the bus. A display interface 125 is also connected to the bus and interfaces the computer display 120 to the central processing unit and to other devices. In this exemplary embodiment, read only memory (ROM) 160 and random access memory (RAM) 165 provides storage of program and data information utilized by the CPU 155. A disk controller 170 permits information to be read from and written to mass storage such as optical memory 171, hard drive 172 and floppy drive 173. A communications port 185 provides a communications interface between external devices and the computer bus 150. In the example shown, a voice synthesizer 180 is also utilized to generate speech for the audio presentation of information to a user. An optional RF data link 190 can be utilized to provide access to an external network, such as the worldwide web, over a radio or cellular telephone link.

Figure 1C:
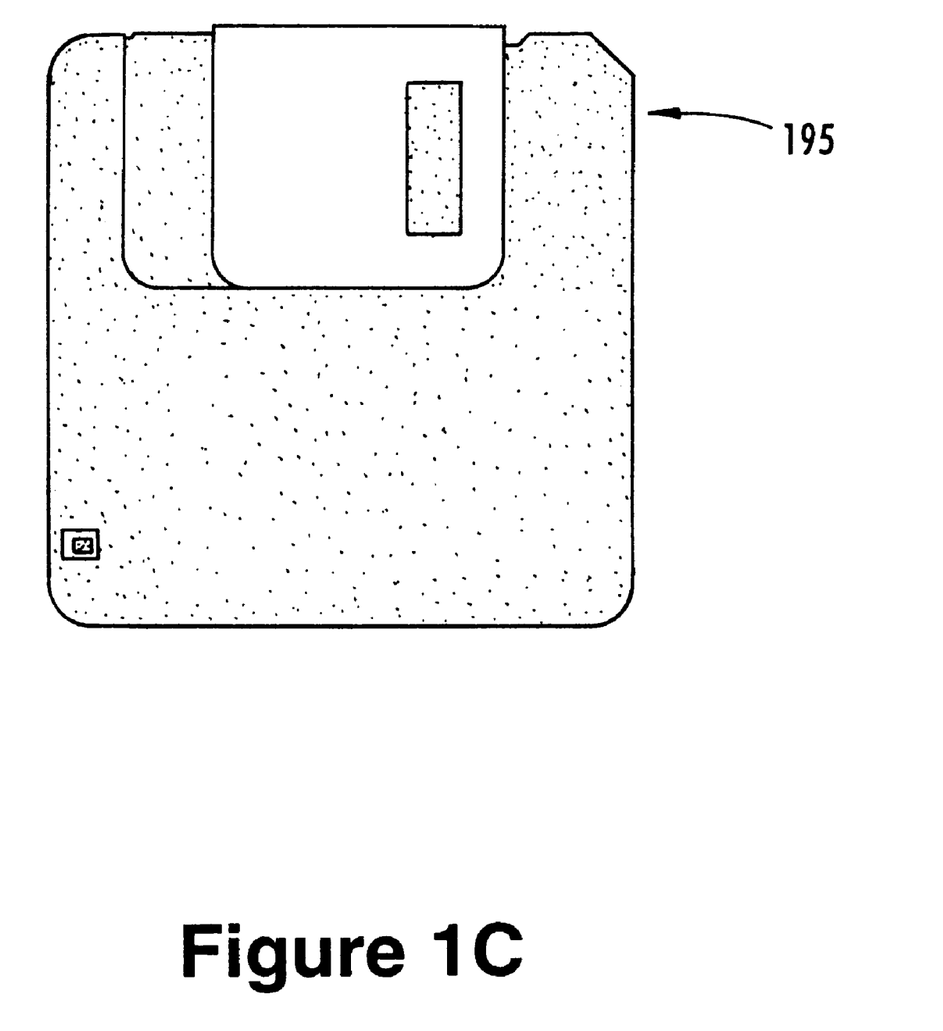
FIG. 1C is an illustration of an exemplary memory medium suitable for storing programs and data in accordance with the invention.

FIG. 1C is an illustration of an exemplary memory medium suitable for storing program and data information in accordance with the invention. In the example shown, program and data information restored on a floppy disk 195.

Figure 2:
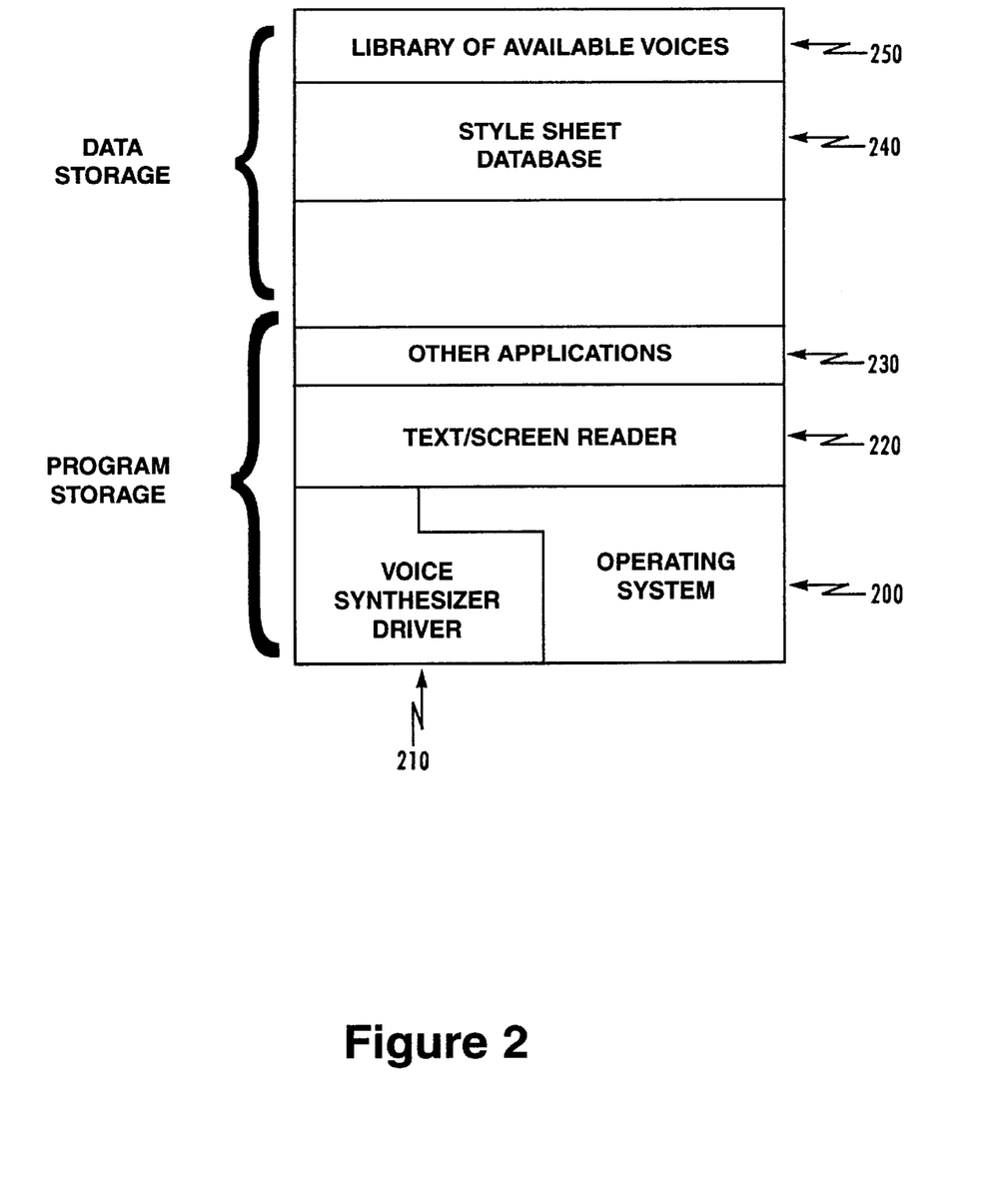
FIG. 2 is a diagram of an exemplary software architecture shown in relation to memory, suitable for carrying out the invention.

FIG. 2 is a diagram of an exemplary software architecture, shown in relation to memory, suitable for carrying out the invention. Memory is typically divided into two sections, one for storing programs and one for storing data and other information. The allocation of particular data or program elements to various memory elements is dictated by either performance considerations or is relatively arbitrary. For example, which data might be resident in RAM versus stored on hard drive or which data might be resident in processor cache versus RAM will be dictated more by performance considerations than anything else.

An operating system 200, provides a convenient and standardized interface for a variety of application programs to be run on a computer system. In the example shown in FIG. 2, a text/screen reader 220 is shown in memory which may be utilized to control a voice synthesizer driver 210 which itself controls a voice synthesizer to present textual information to a user in an audible fashion. A voice synthesizer driver 210 can either utilize the services of operating system 200 or may bypass them, as shown in FIG. 2, to directly control the hardware of the voice synthesizer. A variety of other application programs 230 may also be stored in memory. In one application of particular interest for this example, a voice browser application may be running and utilize the services of a text/screen reader to permit world wide web pages to be presented to a user in an audible form.

In the data storage area, a library of available voices for the voice synthesizer, shown at 250, may be stored in memory. In addition, a stylesheet data base, 240, discussed more hereinafter, may also be stored in memory.

Figure 3:
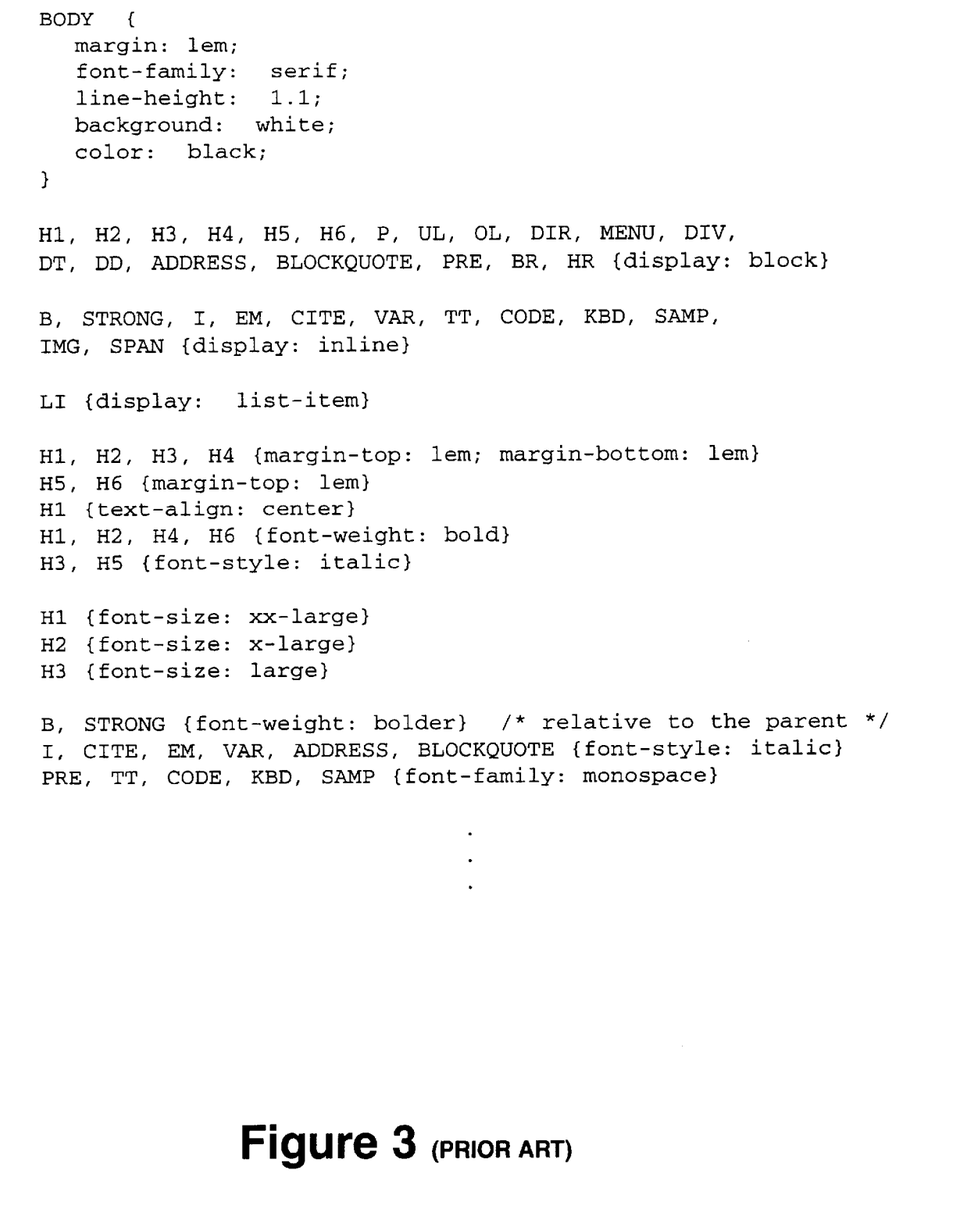
FIG. 3 is an illustration of part of a prior art stylesheet.

FIG. 3 is an illustration of part of a prior art stylesheet. The particular stylesheet shown in FIG. 3 is taken from the cascading stylesheet, level 1 recommendation referred to above. The meanings of the particular terms are reasonably intuitive for a person conversant with hypertext mark-up language (html). The combinations of characters shown in upper case are for the most part html identifiers utilized with embedded formatting commands in a textual presentation. Associated with certain groups of html identifiers and contained within { } are one or more properties to be associated with that html identifier. Those properties consist of a property type such as "font-family" separated from a value such as "serif" by a colon.

In the example utilized to illustrate the invention, the prior art cascading stylesheets, such as shown in FIG. 3, are extended to enable encoding of voice presentation properties. The properties, in this example, are voice-family, voice-pitch, voice-variant, and voice-speed.

The following descriptions help illustrate and explain these properties.

Voice-family: name-of-voice

Four generic voices are provided: man, woman, boy, girl. Additional voices may be defined (e.g., Fred, Lisa) in a manner parallel to that used to specify the font-family for visual presentation. The recommended use of named voices is to provide multiple alternatives and end with one of the generic voices to increase the probability that the user has one of the voices installed. If the user has none of the specified voices installed, then the default voice for the user's browser is used. For example:

BODY {voice-family: "Fred, Joe, man"}

If the user's system has Fred's voice installed, then it is used. Otherwise Joe's voice is used if available, and if none of the named voices are available, the generic male voice is used.

Voice-Pitch: pitch-indication

The pitch indication can either be a relative indication (relative to the pitch of the parent element) measured in octaves or a named pitch from the following exemplary list: bass, baritone, tenor, contralto, mezzosoprano, soprano. For example:

BODY {voice-pitch: baritone}

STRONG {voice-pitch: -loc}

This stylesheet will cause most text to be read in a baritone voice but text encoded as STRONGLY emphasized will be read one octave deeper.

Voice-variant: name-of-variation

Variations of the voice can be applied if supported by the user's speech synthesizer. If not supported, an unmodified voice is used. For example:

A {voice-family: man; voice-variant: danish-accent}

This stylesheet component will cause hypertext anchors to be read by a male voice with a Danish accent (if available).

Voice-speed: number |fast| slow

The voice-speed property is used to control the speed of the voice. The number can be given in absolute terms as a number of words per minute or as a relative percentage value (relative to the parent element's voice speed). For example:

BODY {voice-speed: 50 wpm}

BLOCKQUOTE {voice-speed: 120%}

This stylesheet will cause the page to be read at a speed of 50 words per minute, except that blockquotes are read at a speed of 60 words per minute.

Figure 4:
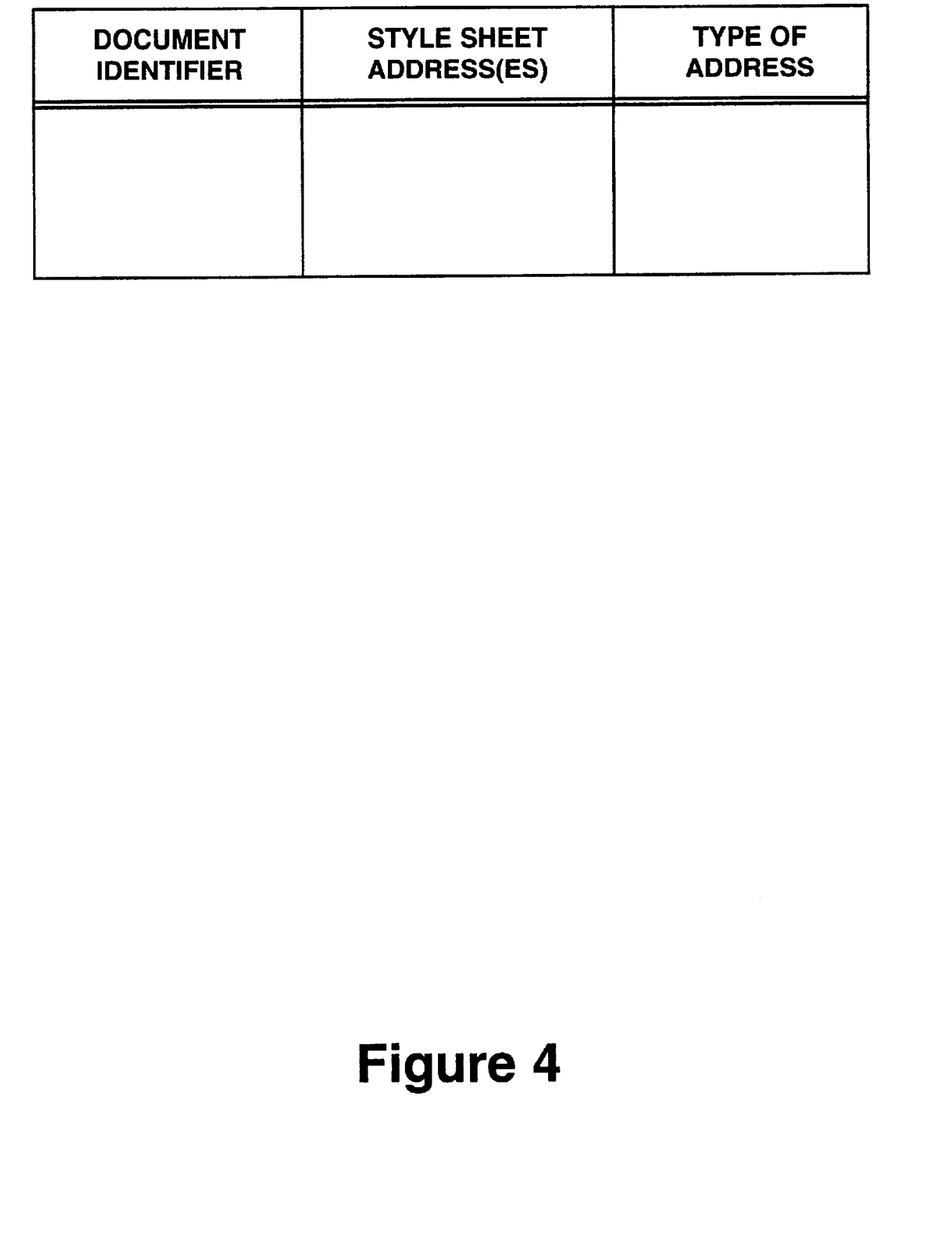
FIG. 4 is an illustration of an exemplary stylesheet data base layout.

FIG. 4 is an illustration of an exemplary stylesheet data base. A stylesheet data base 240, shown in FIG. 2 can be implemented, in one example, as shown in FIG. 4. FIG. 4 shows three columns. Each record in the data base has an entry for each of the columns. When a document refers to a particular stylesheet, the document identifier is listed in column 1. The stylesheet address or addresses of one or more stylesheets associated with that document are listed in column 2. The type of address listed in column 2 is identified in column 3 in this example. If the document in question is local, the document identifier shown in FIG. 1 may be a filename on the local computer. Otherwise, it may be a network address where the document can be retrieved. Stylesheets may also be local or remote. If they are local, then they are identified by a particular device and address range within the device between which the information is stored. If the stylesheet is remotely located, column 2 will contain a network address where the stylesheet may be retrieved. The type of address, as shown in column 3, can be either local or remote or it may be local-default.

A record entry, such as that shown in the data base of FIG. 4, serves to link documents with stylesheets in a manner designed to facilitate presentation of the document. The information need not necessarily be stored in this manner. As an alternative, once one or more file sheets have been combined as discussed more hereinafter into a presentation file sheet, which could be stored together with the document as part of the same file.

Stylesheets, in use, can be generated by an author as part of the process of creating a document or can be specified by a user to ensure that documents generated by others are presented in a style that the user prefers or combination of the two.

Figure 5:
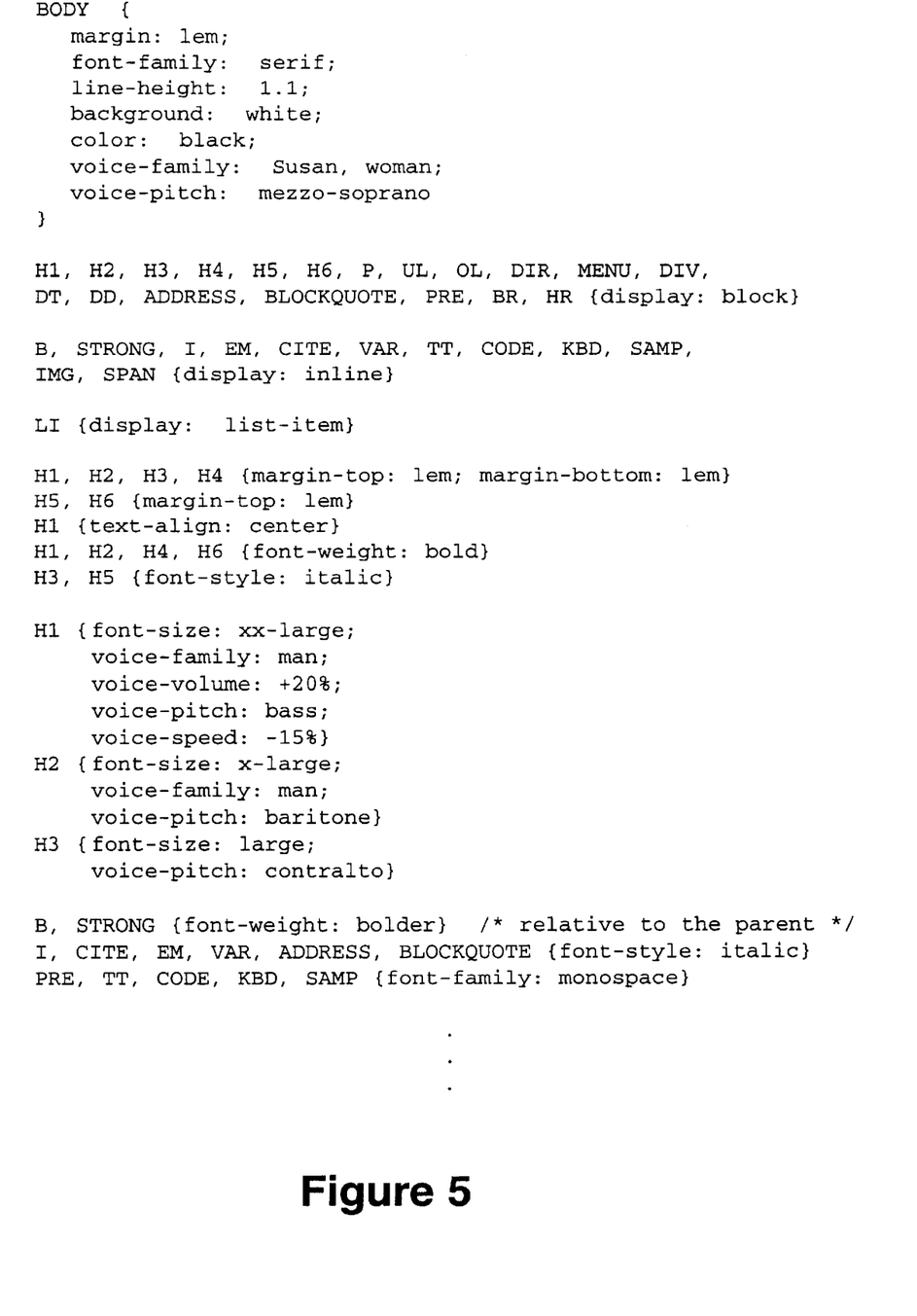
FIG. 5 is an illustration of part of a stylesheet including audio and or voice elements in accordance with the invention such as might be generated by an author of a document.

FIG. 5 is an illustration of part of a stylesheet including audio and/or voice elements in accordance with the invention, illustrating an author generated stylesheet. The author generated stylesheet illustrated in FIG. 5, expands the prior art stylesheet illustrated in FIG. 3 by including, in this example, a voice presentation properties. Comparing FIG. 5 with FIG. 3, in the BODY section, properties for a voice-family and voice-pitch have been included in FIG. 5. The voice-family property includes two values separated by a comma. The first is a named voice "Susan" and the second is a voice "woman". If a computer presenting information in accordance with the stylesheet with FIG. 5 is equipped with a named voice "Susan", then the voice "Susan" will be utilized to present the information. If not, a general voice "woman", universally available across all synthesizers would be utilized as a backup.

The second area in which the stylesheet of FIG. 5 differs from the corresponding one in FIG. 3 is that the headings H1, H2 and H3 in addition to their font size properties, have been given voice properties. As shown in FIG. 5, text categorized as heading H1 would be presented in a voice-pitch of bass whereas text presented as heading H2 would be presented with a voice-pitch baritone and text identified as heading H3 would be presented with a voice-pitch of contralto. Note also that headings H1 have voice properties which increase the volume of the voice and reduce the voice speed thus changing the style with which the verbal presentation is generated by the voice synthesizer to the user.

Figure 6:
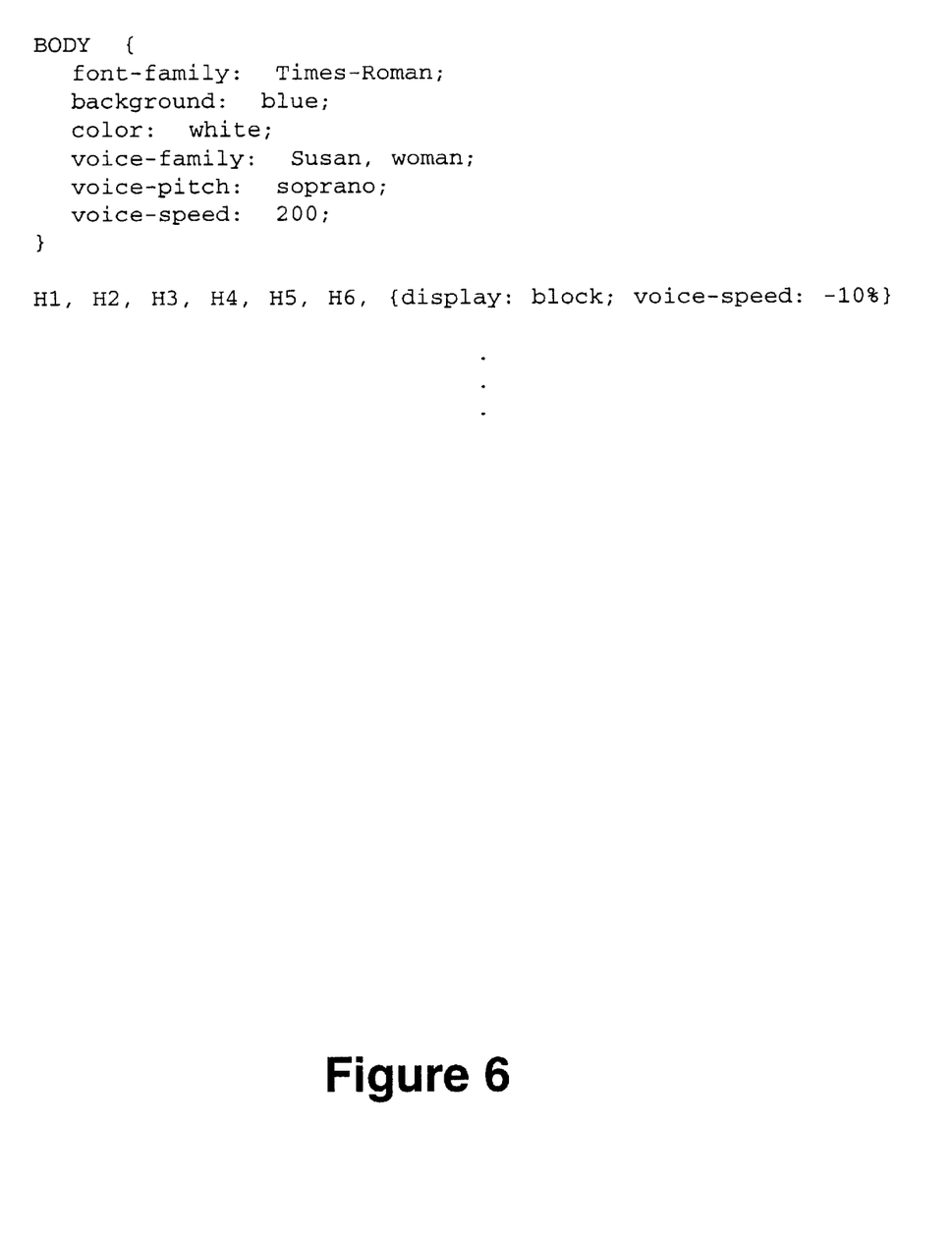
FIG. 6 is an illustration of part of a stylesheet including audio and or voice elements in accordance with the invention such as might be generated by an user of a document.

FIG. 6 is an illustration of part of a style sheet including audio and/or voice elements in accordance with the invention such as might be generated by a user to control the presentation of information in accordance with the user's preferences. In the example shown in FIG. 6, the body of the text will, contrary to the author generated stylesheet shown in FIG. 5, preferably be presented in Times-Roman font-family. In addition, the background and foreground colors are different from that proposed by the author stylesheet. Also shown in the user stylesheet of FIG. 6, the user prefers to have text presented to him in a voice-family of either "Susan" or a woman's voice, prefers that the voice-pitch be soprano and prefers that the voice speed with which information is presented to the user be at 200 words per minute. In addition, the user prefers that headings H1–H6 be displayed in block format and with a voice speed reduced by 10% from the base speed to call attention to the headings. A user stylesheet of the type shown in FIG. 6 might be utilized as a default stylesheet for controlling the presentation of information to the user.

Figure 7:
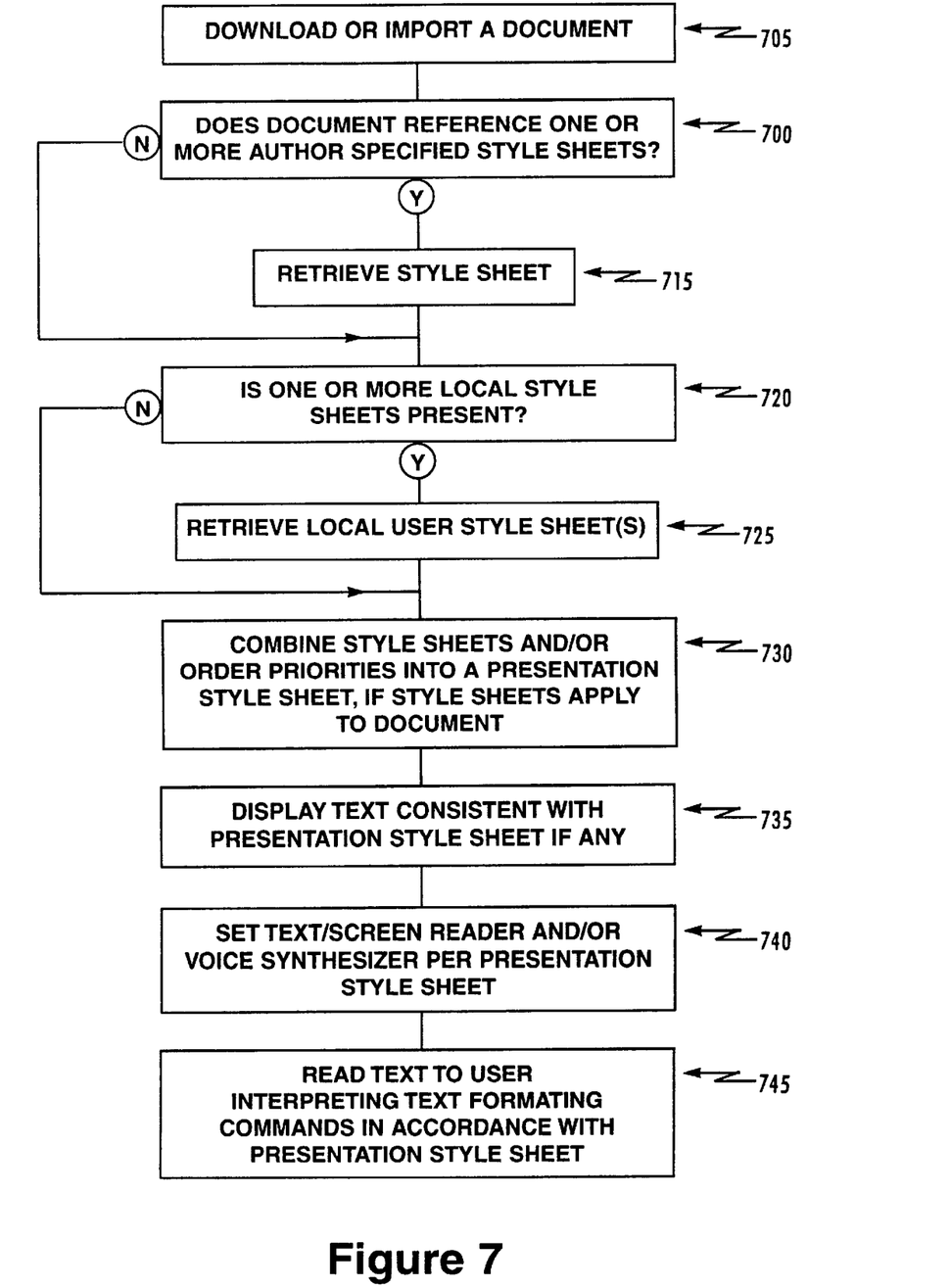
FIG. 7 is a flow chart of a process for using stylesheets including audio and/or voice elements in accordance with the invention.

FIG. 7 is a flowchart of a process for using stylesheets including audio and/or voice elements in accordance with invention. When a user downloads or imports a document (705), a check is made to determine whether the document references one or more author-specified stylesheets (710). If it does, the stylesheet is retrieved (715). This portion of the process of FIG. 7 can be better understood with reference to FIG. 8 which is an illustration of a document containing text formatting commands which contain a reference to an external stylesheet.

Figure 8:
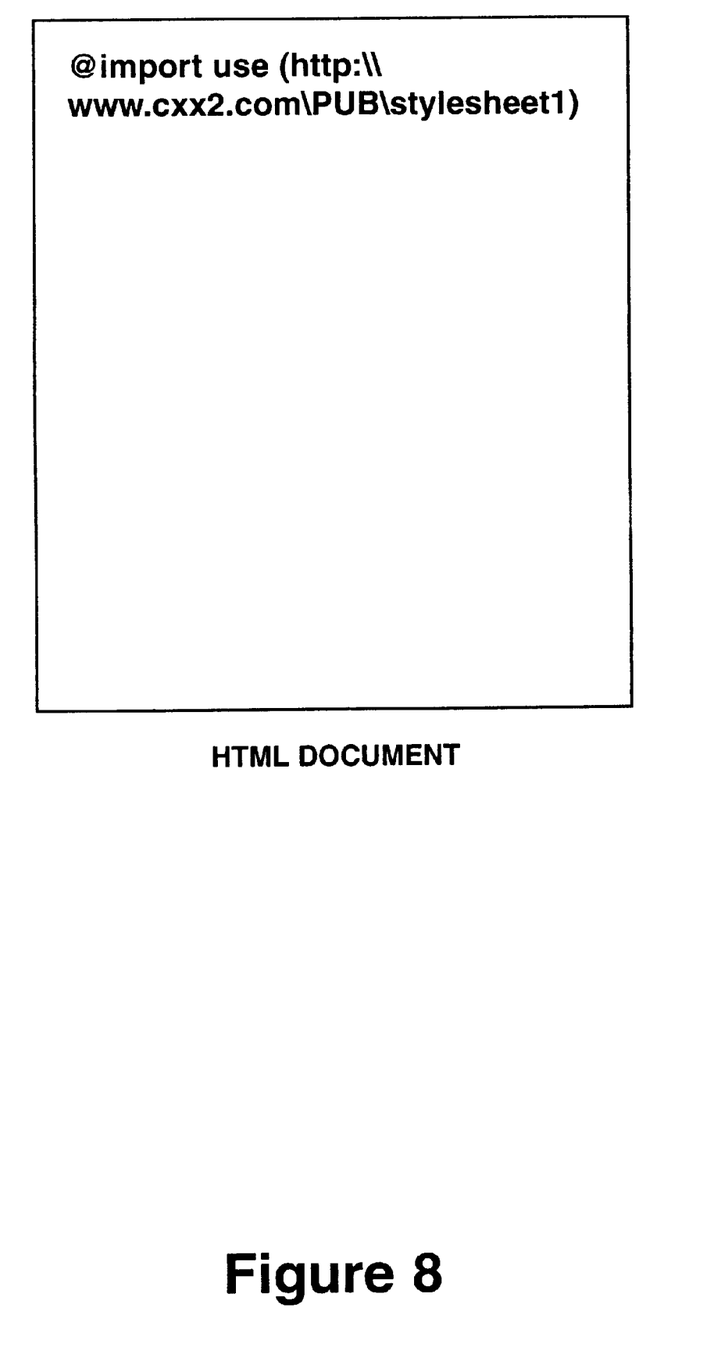
FIG. 8 is an illustration of a document containing text formatting commands which contains a reference to an external stylesheet.

In the example shown in FIG. 8, an html document is illustrated which contains at or near the beginning, an "@import url" command followed by a network address, in this case an Internet address for the World Wide Web. Thus, if a document contains a reference to one or more author specified stylesheets, (710) such as that illustrated in FIG. 8, a stylesheet will be retrieved over the network.

Continuing with FIG. 7, a check is made to determine if one or more local user stylesheets is present (720). If at least one is, it will be retrieved (725). If a plurality are present, one may either retrieve them all or present them all to the user for selection of the relevant ones for this presentation. Whichever approach is taken, the local user stylesheets are retrieved (725).

FIGS. 5 and 6, presented a situation where a local user stylesheet conflicted with style definitions specified in an author specified stylesheet. The Cascading Stylesheet, Level 1 Recommendation referred to above, specifies how to resolve conflicts and how to combine a plurality of stylesheets into a consistent set of presentations, referred to hereinafter as a presentation stylesheet.

Thus, returning to FIG. 7, if a plurality of stylesheets are applied to a presentation of a particular document, they will be combined and/or ordered in accordance with priorities into a presentation stylesheet for application to the document. The text is then displayed in a manner consistent with the presentation stylesheet (735) and the text/screen reader and/or voice synthesizer properties are set in accordance with the stylesheet (740). The partitioning of functionality between a text/screen reader and a voice synthesizer normally is not a significant consideration. Some implementers may put certain functionality in the screen reader whereas others may put the same functionality in a voice synthesizer. Once the text/screen reader and voice synthesizers have been set up in accordance with the presentation stylesheet, the screen or the text is read to the user using the voice synthesizer, interpreting the text formatting commands imbedded within the text and in accordance with the presentation stylesheet (745).

Figure 9:
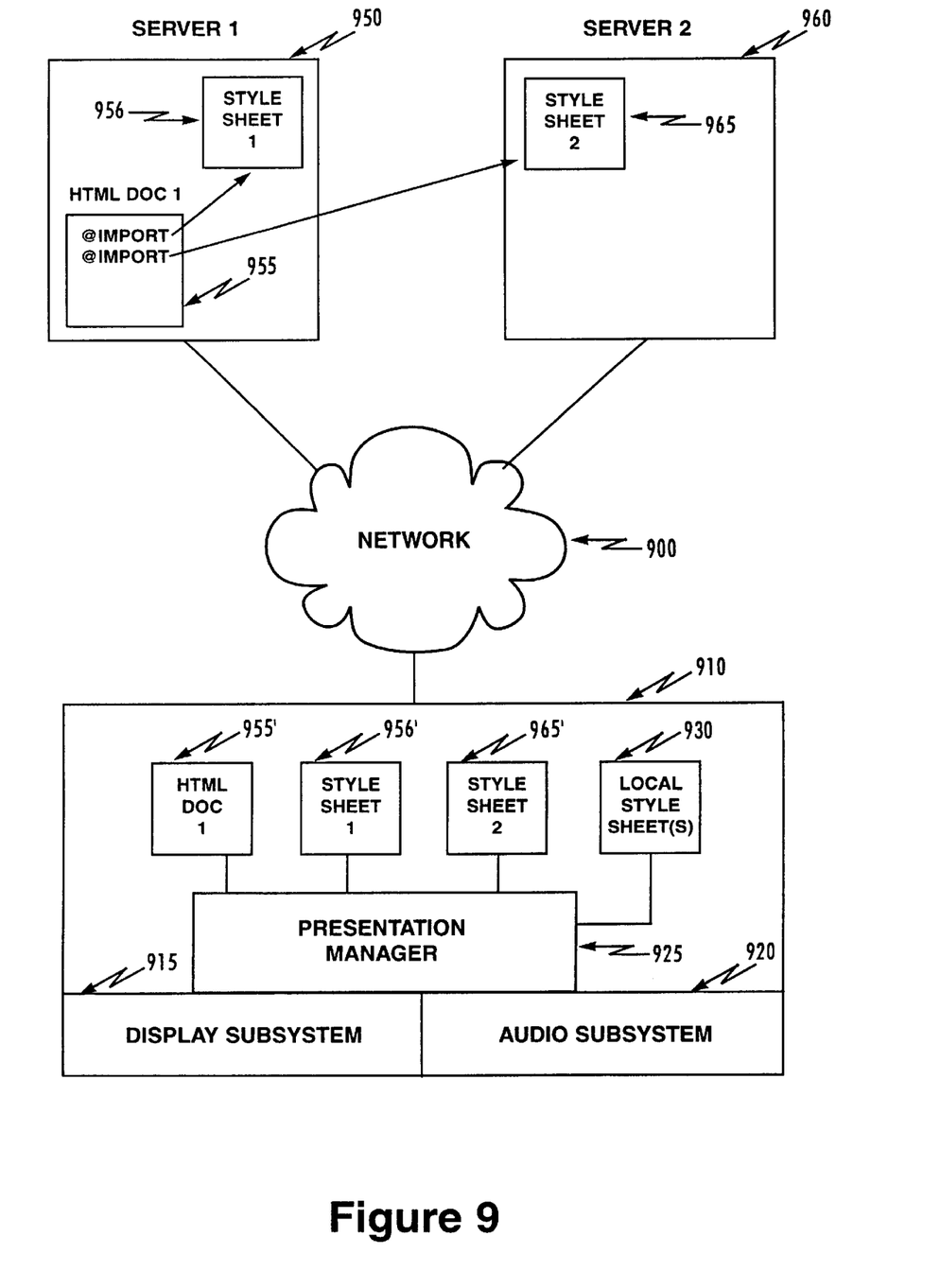
FIG. 9 is a block diagram of a system illustrating the use of author and user generated stylesheets in accordance with the invention.

FIG. 9 is a block diagram of a system illustrating the use of author and user generated stylesheets in accordance with the invention. In the example shown, server 1 (950) and server 2 (960) are servers on a network 900, such as the World Wide Web. A user computer 910, such as shown in FIGS. 1 and 2, is also connected to the network 900. As illustrated here, server 1 has available for public access an html document 1 (955) which document contains two "@import" statements. The first contains an address pointing toward stylesheet 1 (956) resident on the same server. The second points to stylesheet 2 (965) shown on server 2.

When a user using computer 910 accesses server 1 and downloads html doc 1 into his computer, the process of FIG. 7 is carried out. The stylesheets 956 on server 1 and 965 on server 2 are copied down into the user's computer at 956' and 965'. In addition, the user may have specified one or more local stylesheets for either optional or default use (930). The user's computer illustrated in FIG. 9 includes a display subsystem 915 for presenting information on a display device, such as a cathode ray tube. In addition, as shown in FIG. 9, the user's computer contains an audio subsystem 920 for presenting audio information to a user. As discussed in conjunction with the process of FIG. 7, the information from html doc 1 will be displayed and/or read to the user. The text display style statements contained in the stylesheets will control the display of text on the display subsystem 915. The audio style elements contained in the stylesheets will be utilized to control presentation of information to the audio subsystem 920. The presentation manager 925 symbolically represents the portions of the user's computer which carry out the process of FIG. 7 in which the stylesheets are combined in accordance with the rules and the information presented to the user by the appropriate display or audio subsystem.

When stylesheets in accordance with the invention are downloaded into a computer which is not equipped to provide audio presentations to the user, by voice synthesizer or otherwise, the audio style statements are simply disregarded. This is specifically provided for within the Cascading Stylesheet, Level 1 Recommendation and is a general property of html. When a command is encountered which the system doesn't recognize, it simply ignores it. Thus, the existence of audio style commands in a stylesheet will not adversely affect the style statements for display of text. However, when styles can be set for an audio presentation, those style statements will be recognized and implemented. The result is a much more pleasing and semantically consistent audio presentation for the user.

There has been thus been described methods, apparatus, systems and computer program products which expand the capabilities of stylesheets into the audio domain. Thus, the problems with the prior art are overcome and the user is provided with expanded functionality.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for presenting textual information in audible form, comprising:
   a. a computer equipped with an voice synthesizer;
   b. an application, running on computer, causing said voice synthesizer to present textual information to a user in audible form; and
   c. a style sheet containing audio style elements for controlling said voice synthesizer.

2. Apparatus of claim 1 in which said application is a text reader.

3. Apparatus of claim 1 in which said application is a screen reader.

4. Apparatus of claim 1 in which said style sheet is a style sheet specified by an author or distributor of said textual information.

5. Apparatus of claim 1 in which said style sheet is a style sheet specified by a user of said computer.

6. Apparatus of claim 1 in which said audio style elements include at least one of voice-family, voice-pitch, voice-variant, voice-speed and volume.

7. Apparatus of claim 1 in which said application is a browser application.

8. Apparatus of claim 1 in which said computer further comprises an RF data link for wireless access to a network.

9. Apparatus of claim 8 in which said network accesses the World Wide Web.

10. Apparatus of claim 1 in which said computer stores a library of voices in memory for use with said voice synthesizer.

11. Apparatus of claim 1 in which said computer stores a database of styles sheets.

12. Apparatus of claim 11 in which said database includes at least one style sheet that originated on a different computer.

13. A method of controlling the presentation of information generated by a voice synthesizer, comprising the step of:
   a. providing an element for performing a step of controlling said voice synthesizer using one or more style sheets containing audio style elements for the audible presentation of information.

14. A method of controlling the presentation of information generated by a voice synthesizer, comprising the step of:
   a. providing an element for performing the step of retrieving one or more style sheets containing audio style elements for the audible presentation of information through a network.

15. The method of claim 14 further comprising the steps of:
   a. combining information from a plurality of styles sheets into a presentation style sheet to control the presentation of both text and audible information.

16. The method of claim 14, further comprising the step of:
   a. providing an element for performing the step of presenting audible information in accordance with said one or more style sheets based on embedded text formatting commands.

17. A system for presenting textual information in audible form, comprising:
   a. a network;
   b. at least one server connected to said network and containing a document containing text;
   c. at least one server connected to said network containing at least one stylesheet containing audio style elements for audible presentation of textual information; and
   d. a computer connected to said network for downloading a stylesheet from a server and controlling the presentation of textual information in audible form based on said style sheet.

18. A computer program product, comprising:
   a. a memory medium; and
   b. a computer program stored on said memory medium, said computer program comprising instructions for controlling a voice synthesizer using one or more style sheets containing audio style elements for the audible presentation of information.

19. A computer program product, comprising:
   a. a memory medium; and
   b. a computer program stored on said memory medium, said computer program comprising instructions for retrieving one or more style sheets containing audio style elements for the audible presentation of information through a network.

20. The computer program product of claim 19, in which said computer program further comprises instructions for combining information from a plurality of styles sheets into a presentation style sheet to control the presentation of both text and audible information.

21. A computer program product, comprising:
   a. a memory medium; and
   b. a computer program stored on said memory medium, said computer program comprising instructions for presenting audible information in accordance with one ore more style sheets containing audio style elements based on embedded text formatting commands.

* * * * *